United States Patent [19]

Furuta et al.

[11] Patent Number: 4,838,621

[45] Date of Patent: Jun. 13, 1989

[54] ANTI-SKID APPARATUS FOR AN AUTOMOTIVE VEHICLE

[75] Inventors: Youichi Furuta, Chiryu; Masamoto Ando, Toyota; Hiroaki Takeuchi, Toyota; Noboru Noguchi, Toyota; Nobuyasu Nakanishi, Toyota, all of Japan

[73] Assignees: Aisin Seiki Kabushiki Kaisha, Kariya; Toyota Jidosha Kabushiki Kaisha, Toyota, both of Japan

[21] Appl. No.: 160,339

[22] Filed: Feb. 25, 1988

[30] Foreign Application Priority Data

Feb. 27, 1987 [JP] Japan .................. 62-46205

[51] Int. Cl.$^4$ .................................................. B60T 8/02
[52] U.S. Cl. .................... 303/115; 303/113; 303/114; 303/119
[58] Field of Search ............... 303/113, 114, 115, 119, 303/116; 60/547.1, 591, 581

[56] References Cited

U.S. PATENT DOCUMENTS

| | | | |
|---|---|---|---|
| 4,050,748 | 9/1977 | Belart | 303/114 |
| 4,116,495 | 9/1978 | Belart | 303/116 |
| 4,492,414 | 1/1985 | Kozakai et al. | 303/116 |
| 4,552,413 | 11/1985 | Fujii et al. | 303/106 |
| 4,565,411 | 1/1986 | Seiber | 303/110 |
| 4,597,611 | 7/1986 | Nishimura et al. | 303/116 |
| 4,602,824 | 7/1986 | Nishimura et al. | 303/100 |
| 4,605,263 | 8/1986 | Ando et al. | 303/116 |
| 4,624,508 | 11/1986 | Adachi et al. | 303/116 |
| 4,636,008 | 1/1987 | Adachi et al. | 303/91 |
| 4,636,010 | 1/1987 | Adachi et al. | 303/115 |
| 4,655,509 | 4/1987 | Ando et al. | 303/10 |
| 4,728,155 | 3/1988 | Resch | 303/114 |
| 4,750,329 | 6/1988 | Horiuchi et al. | 303/114 |

FOREIGN PATENT DOCUMENTS

| | | |
|---|---|---|
| 56-10219 | 3/1981 | Japan . |
| 57-172863 | 10/1982 | Japan . |
| 58-199258 | 11/1983 | Japan . |
| 59-227552 | 12/1984 | Japan . |
| 61-222850 | 3/1986 | Japan . |
| 2141195A | 12/1984 | United Kingdom . |
| 2168771A | 6/1986 | United Kingdom . |

*Primary Examiner*—Andres Kashnikow
*Assistant Examiner*—Matthew C. Graham
*Attorney, Agent, or Firm*—Burns, Doane, Swecker & Mathis

[57] ABSTRACT

An anti-skid apparatus for installation in a vehicle braking system having a regulator valve for producing a hydraulic power pressure in accordance with a hydraulic braking pressure from a master cylinder. A control cylinder is disposed in a hydraulic circuit connecting the master cylinder to a wheel brake cylinder, and comprises a cylinder body having a cylinder bore defined therein and a piston axially slidably disposed within the cylinder bore. This piston forms at its one end a pressure chamber communicating with the wheel brake cylinder, and is applied at its the other end with the hydraulic power pressure from the regulator. Disposed in the control cylinder is a normally open cut-off valve which normally permits the flow of the hydraulic braking pressure from the master cylinder into the pressure chamber and blocks the flow of the hydraulic braking pressure when the piston moves to an extent more than a predetermined distance from its initial position for decreasing the volume of the pressure chamber. And, a changeover valve is disposed between the regulator valve and the control cylinder, and applies the hydraulic power pressure to the piston or discharges it from the control cylinder.

13 Claims, 2 Drawing Sheets

ANTI-SKID APPARATUS FOR AN AUTOMOTIVE VEHICLE

BACKGROUND OF THE INVENTION

1. Field of the Invention

The present invention relates to an anti-skid apparatus for use in an automotive vehicle, and more particularly, to an anti-skid apparatus for installation in a vehicle braking system between a master cylinder and wheel brake cylinders to prevent the vehicle wheels or road wheels from locking in braking operation.

2. Description of the Prior Art

As one of such anti-skid apparatus as described above, Japanese Patent Application laid open in 1983 under publication No. 58-199258 discloses an anti-skid apparatus which comprises: (a) a regulator valve arranged to regulate a hydraulic pressure supplied by a fluid pump and produce a hydraulic power pressure in accordance with a hydraulic braking pressure from a master cylinder; (b) a piston arranged to be moved forward by a hydraulic braking pressure of a hydraulic circuit between a wheel brake cylinder and the master cylinder, whereby the volume of this hydraulic circuit is increased, and moved backward by the hydraulic power pressure, whereby the volume of the hydraulic circuit is decreased; (c) a normally open cut-off valve disposed in a hydraulic circuit between the piston and the master cylinder and arranged to close this circuit during the forward and backward movement of the piston; (d) a changeover valve arranged to apply the hydraulic power pressure to the piston or discharge it therefrom dependent upon a locking condition of the road wheels; and (e) a bypass valve arranged to bypass the normally open cut-off valve and connect the master cylinder to the wheel brake cylinder when the hydraulic power pressure produced by the regulator valve becomes lower than the pressure to be regulated in accordance with the hydraulic braking pressure from the master cylinder.

In the anti-skid apparatus described above, when the changeover valve is inoperative, usual braking operation is achieved, and when the changeover valve is actuated under such a condition that the hydraulic power pressure is higher than the pressure to be regulated in accordance with the hydraulic braking pressure, the anti-locking or anti-skid operation of the road wheels is achieved. When the changeover valve is actuated under such a condition that the hydraulic power pressure is lower than the pressure to be regulated in accordance with the hydraulic braking pressure, the bypass valve acts to maintain the usual braking operation, whereby a defect resulted from such movement of the piston as being held in its forward position without moving backward is prevented to be caused.

In the above-described anti-skid apparatus, however, the normally open cut-off valve and the bypass valve are provided with individually, so that the apparatus tends to be expensive, large and heavy. In addition, the apparatus disclosed in the above publication, the hydraulic power pressure is utilized only for moving the piston backward, a brake booster such as a vacuum booster is needed for a boost operation. Accordingly, the braking system as a whole tends to be expensive, large and heavy.

SUMMARY OF THE INVENTION

It is, therefore, an object of the present invention to provide an anti-skid apparatus for an automotive vehicle which effectively prevent the road wheels from locking in braking operation, and wherein the anti-skid apparatus is relatively small in size, light in weight and economical to manufacture.

It is another object of the present invention to provide an anti-skid apparatus which also functions as a brake booster whereby the braking system as a whole is economical to manufacture.

It is further object of the present invention to provide an anti-skid apparatus having a control cylinder which is capable of effectively preventing the road wheels from locking in braking operation, functioning as a brake booster, and maintaining the usual braking operation when the hydraulic power pressure is insufficient.

In accomplishing these and other objects, an anti-skid apparatus for an automotive vehicle according to the present invention is installed in a vehicle braking system having a master cylinder and a wheel brake cylinder connected thereto. The anti-skid apparatus according to the present invention comprises a regulator valve for producing a hydraulic power pressure in accordance with a hydraulic braking pressure from the master cylinder, a control cylinder disposed in a hydraulic circuit connecting the master cylinder to the wheel brake cylinder, a changeover valve disposed in a hydraulic circuit connecting the regulator valve to the control cylinder and selectively placed in one of a first operating position for applying the hydraulic power pressure to the piston of the control cylinder, and a second operating position for discharging the hydraulic power pressure from the control cylinder.

In the above arrangement, the control cylinder includes a cylinder body having a cylinder bore defined therein, and a piston axially slidably disposed in the cylinder bore. The piston forms at one end thereof, with the cylinder bore, a pressure chamber which communicates with the wheel brake cylinder. The volume of the pressure chamber is maximum at the initial position of the piston. At the other end of the piston is applied with the hydraulic power pressure from the regulator valve. And, the control cylinder further includes a normally open cut-off valve which is arranged to normally permit the flow of the hydraulic braking pressure from the master cylinder into the pressure chamber and to block the flow of the hydraulic braking pressure when the piston moves to an extent more than a predetermined distance from the initial position for decreasing the volume of the pressure chamber.

The control cylinder preferably comprises biasing means for biasing the piston toward its initial position.

More specifically, the cylinder body of the control cylinder preferably forms therein a stepped bore having a large-diameter bore and a small-diameter bore which is co-axially communicated with the large-diameter bore. The piston preferably comprises a large-diameter piston which is axially slidably disposed within the large-diameter bore and applied at its one end with the hydraulic power pressure, and a small-diameter piston which is axially slidably disposed within the small-diameter bore. This small-diameter piston forms at one end thereof the pressure chamber and contacts at the other end thereof with the other end of the large-diameter piston.

BRIEF DESCRIPTION OF THE DRAWINGS

The above stated objects and following description will become readily apparent with reference to the accompanying drawings, in which.

DESCRIPTION OF THE PREFERRED EMBODIMENT

Figure 1:
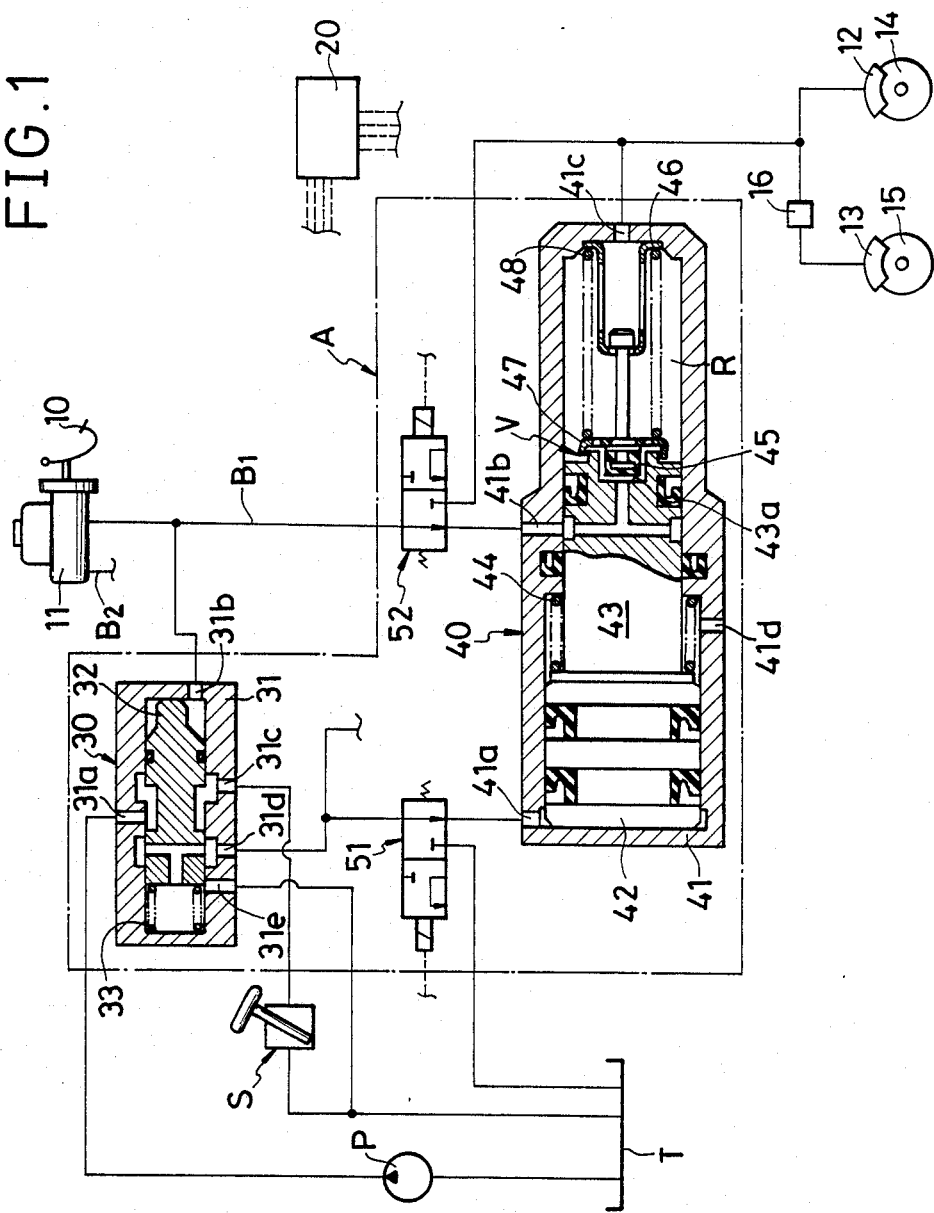
FIG. 1 is a schematic illustration of an anti-skid apparatus installed in a vehicle braking system according to a preferred embodiment of the present invention.

Referring to FIG. 1, there is schematically illustrated a braking system for an automotive vehicle which includes a tandem brake master cylinder (hereinafter it merely refers to as a master cylinder) 11 to be activated by depression of a brake pedal 10. The master cylinder 11 has a rear pressure chamber connected to a right-hand front wheel cylinder 12 and a left-hand rear wheel cylinder (hereinafter it merely refers to as a wheel cylinder) 13 by way of a hydraulic circuit $B_1$. The master cylinder 11 also has a front pressure chamber connected to a left-hand front wheel cylinder and a right-hand rear wheel cylinder (both not shown herein) by way of a hydraulic circuit $B_2$, whereby the hydraulic braking pressure applied to each of the respective wheel cylinders is independently controlled to prevent the respective road wheels 14 and 15 (left-hand front road wheel and right-hand rear road wheel are not shown herein) from locking in braking operation. Designated by 16 is a well known proportioning valve.

The anti-skid apparatus comprises sensors (not shown herein) for detecting the rotational speed of the respective road wheels, a controller 20 for judging as to whether the respective road wheels are in the particular locking condition based on electric signals from the respective sensors and then controlling the action of a changeover valve 51 and an auxiliary changeover valve 52, which will be described hereinafter, dependent upon the aforementioned locking condition of the respective road wheels, and it further comprises an actuator A.

The actuator A is operative by utilizing the pressurized fluid that is to be used also for a power-assisted steering apparatus S. The actuator A includes a regulator valve 30, a pair of control cylinders 40 (only one shown herein), a pair of changeover valves 51 (only one shown herein), and a pair of auxiliary changeover valves 52 (only one shown herein). The omitted control cylinder, the changeover valve and the auxiliary changeover valve are arranged to control the hydraulic pressure to be applied to the omitted wheel cylinders, and their construction and function are substantially the same as those of the control cylinder 40, the changeover valve 51, and the auxiliary changeover valve 52 shown in FIG. 1 respectively.

The regulator valve 30 comprises a valve body 31, a piston 32 axially slidably disposed within a bore defined in the valve body 31, and a spring 33 disposed within the bore. The valve body 31 has a first or inlet port 31a to which the hydraulic pressure is applied from a pump P driven by an engine (not shown), a second or inlet port 31b connected to the master cylinder 11, a third or outlet port 31c connected to the power-assisted steering apparatus S, a fourth or outlet port 31d connected to the changeover valve 51, and a fifth or drain port 31e connected to a fluid reservoir T. The piston 32 is normally biased by the spring 33 toward the second port 31b. In operation of the regulator valve 30, the piston 32 is moved in the bore of the valve body 31 so as to establish a balance between the hydraulic braking pressure from the master cylinder 11, which is applied through the second port 31b, and the hydraulic power pressure applied to the changeover valve 51 through the fourth port 31d and the biasing force of the spring 33. Thus, the hydraulic power pressure which increases in response to the increase of the hydraulic braking pressure from the master cylinder 11 is applied to the changeover valve 51 through the fourth or outlet port 31d.

The control cylinder 40 comprises a cylinder body 41, a large-diameter piston 42 and a small-diameter piston 43 which are axially slidably disposed within a large-diameter bore and a small-diameter bore respectively, of a stepped bore of the cylinder body 41, and a spring 44 biasing both pistons 42, 43 as a unit toward their initial positions as shown in FIG. 1. The cylinder body 41 has a first port 41a connected to the changeover valve 51, a second port 41b connected to the auxiliary changeover valve 52, a third port 41c connected to both the wheel cylinders 12, 13, and a fourth port 41d communicating with the atmosphere. The cylinder body 41 may be integral with the valve body 31 of the regulator valve 30. The two pistons 42, 43 may be formed integrally. The fourth port 41d can be omitted. The small-diameter piston 43 is provided therein with a passage communicating with the second port 41b and having an open end which opens to a pressure chamber R formed at the right end of the piston 43 within the small-diameter bore.

The control cylinder 40 also includes a normally open cut-off valve V, which comprises a valve seat 43a provided at the right end of the piston 43 for encompassing the open end of the passage in the piston 43, a valve member 45 fittingly seated on the valve seat 43a, a holder 46 fixedly secured to the cylinder body 41 for restricting the leftward movement of the valve member 45, and a spring 48 mounted between the holder 46 and a retainer 47 integral with the valve member 45. The valve member 45 is biased leftward in FIG. 1 by the spring 48. In operation of the normally open cut-off valve V, when the two piston 42, 43 are in their initial positions as shown in FIG. 1, where a volume of the pressure chamber R is maximum, the second port 41b and the third port 41c are communicated with each other through the passage in the piston 43 and the pressure chamber R. When the two pistons 42, 43 are moved rightward a predetermined distance from their initial positions, the valve seat 43a contacts the valve member 45, so that the communication between the second port 41b and the third port 41c is blocked. Accordingly, when the two pistons 42, 43 are moved rightward in FIG. 1 to an extent more than a predetermined distance from their initial positions as shown in FIG. 1, the hydraulic pressure in the pressure chamber R, which is to be applied to both the wheel cylinders 12, 13, is increased to a level higher than the hydraulic braking pressure from the master cylinder 11.

The changeover valve 51 is a three ports-two positions solenoid-operated directional control valve. When the road wheels 14, 15 are in the particular locking condition, the changeover valve 51 is operative, or alternately energized and de-energized in response to the electric control signal from the controller 20 to control the hydraulic power pressure applied to the piston 42. On the other hand, when the road wheels 14, 15 are out of the particular locking condition, the changeover valve 51 is inoperative, or in its de-energized condition as shown in FIG. 1 to apply the hydraulic power pressure to the piston 42.

The auxiliary changeover valve 52 is a three ports-two positions solenoid-operated directional control valve. The auxiliary changeover valve 52 is energized or de-energized in response to the electric control signal from the controller 20. When the changeover valve 51 is operative, the auxiliary changeover valve 52 is energized to block the communication between the second port 41b and the master cylinder 11 and also to render the second port 41b to communicate with the third port 41c. Reversely, when the changeover valve 51 is inoperative, the auxiliary changeover valve 52 is de-energized to render the second port 41b to communicate with the master cylinder 11.

In operation, when the road wheels 14, 15 are free in non-braking operation, the changeover valve 51 is inoperative, so that the hydraulic power pressure is to be applied to the piston 42 of the control cylinder 40. However, the hydraulic braking pressure in the master cylinder 11 is zero and hence the hydraulic power pressure from the regulator valve 30 is zero, thus allowing the two pistons 42, 43 to return to their initial positions by the spring 44. Therefore, since the normally open cut-off valve V is open to establish a communication between the master cylinder 11 and the pressure chamber R, the master cylinder 11 is communicated with the wheel cylinders 12, 13.

On the other hand, in braking operation, the anti-skid apparatus operates as follows:

(A) In the case where the road wheels 14, 15 are out of the particular locking condition and where the pump P and the regulator valve 30 and their associated parts are in the normally operative condition;

In this case, the hydraulic power pressure applied from the regulator valve 30 is increased in response to the increase of the hydraulic braking pressure from the master cylinder 11. This hydraulic power pressure is applied to the piston 42 of the control cylinder 40 through the changeover valve 51 in its inoperative condition, so that the two pistons 42, 43 are moved rightward to an extent more than a predetermined distance to close the normally open cut-off valve V. As a result, the communication between the master cylinder 11 and the pressure chamber R is blocked and hence the hydraulic pressure in the pressure chamber R is increased to a level higher than the hydraulic braking pressure from the master cylinder 11 to provide a boost action, thereby applying the hydraulic pressure in the pressure chamber R to the wheel cylinders 12, 13 to brake the road wheels 14, 15.

(B) In the case where the road wheels 14, 15 are in the particular locking condition when braked as a result of the operation (A) noted above;

In this case, the changeover valve 51 is alternately energized and de-energized to control the hydraulic power pressure applied to the piston 42 dependent upon the locking condition of the road wheels 14, 15. As the hydraulic power pressure is discharged from the piston 42, the two pistons 42, 43 are moved leftward under the hydraulic pressure in the pressure chamber R and by the biasing force of the spring 44 to increase the volume of the pressure chamber R so that the hydraulic pressure in the wheel cylinders 12, 13 is decreased. Reversely, as the hydraulic power pressure is applied to the piston 42, the two pistons 42, 43 are moved rightward to decrease the volume of the pressure chamber R, thus increasing the hydraulic pressure in the pressure chamber R, which is to be applied to the wheel cylinders 12, 13. As a result, the road wheels 14, 15 are effectively prevented from locking.

(C) In the case where normal supply of the hydraulic pressure to the regulator valve 30 is not effected due to a trouble with the pump P or where adequate increase of the hydraulic power pressure from the regulator valve 30 is not obtained due to a trouble with the regulator valve 30;

In this case, though the hydraulic braking pressure of the master cylinder 11 is increased, adequate increase of the hydraulic power pressure applied from the regulator valve 30 is not effected, thus retaining the piston 42 of the control cylinder 40 in its initial position under the hydraulic pressure in the pressure chamber R and by the biasing force of the spring 44. As a result, the normally open cut-off valve V is kept open so that the hydraulic braking pressure from the master cylinder 11 is applied to the wheel cylinders 12, 13 through the normally open cut-off valve V to brake the road wheels 14, 15 adequately. In this case, however, the boost action as described in the case (A) is not provided.

As is apparent from the mode of operation described above, the hydraulic pressure in the wheel cylinders 12, 13 is decreased and increased by the control cylinder 40, dependent upon the locking condition of the road wheels 14, 15, thereby to effectively prevent the road wheels 14, 15 from locking. The control cylinder 40 functions as a brake booster. The road wheels 14, 15 are braked adequately even in such a condition that the hydraulic power pressure is not applied to the control cylinder 40 sufficiently. Accordingly, it is unnecessary to provide a brake booster and a bypass valve independently as are provided in the prior art apparatus. Further it is possible to manufacture the anti-skid apparatus and yet the whole braking system including the same small in size and light in weight. Consequently its production cost is reduced effectively.

Figure 2:
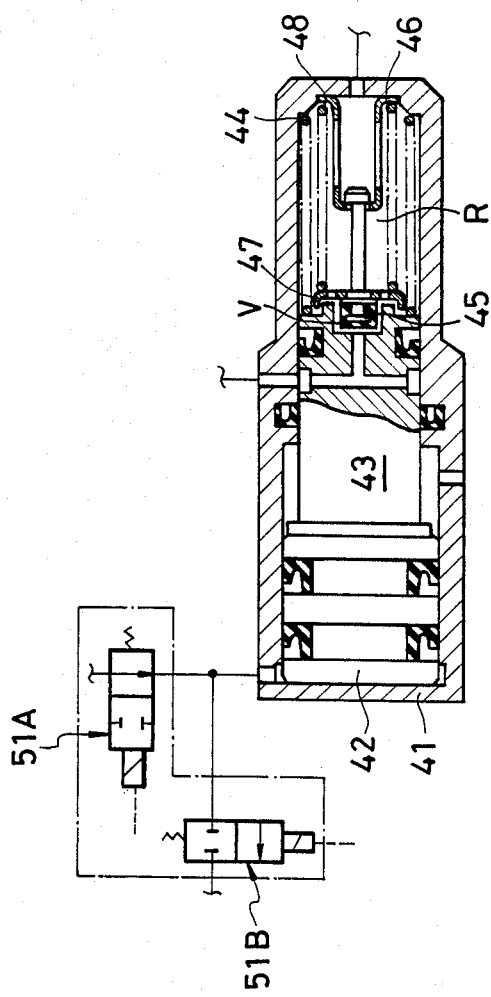
FIG. 2 is a partial schematic illustration of another embodiment of the present invention.

FIG. 2 illustrates a modified anti-skid apparatus according to the present invention, wherein a pair of two ports-two positions solenoid-operated shutt-off valves 51A, 51B are employed in lieu of the changeover valve 51 in FIG. 1. As they are in the operative condition, these valves 51A, 51B can be closed to stop the two pistons 42, 43 at their desired positions. Thus, it is possible not only to decrease and increase but also to maintain the hydraulic pressure. In this embodiment, the spring 44 is disposed within the pressure chamber R to bias the two pistons 42, 43 of the control cylinder 40 toward their initial positions.

In the aforementioned embodiments, the auxiliary changeover valve 52 is disposed between the master cylinder 11 and the control cylinder 40. Whereas, when the two pistons 42, 43 are moved rightward to an extent more than a predetermined distance, the normally open cut-off valve V is closed and remains closed as the hydraulic pressure in the pressure chamber R is higher than that in the master cylinder 11. Accordingly, it is unnecessary to employ the auxiliary changeover valve 52 for the anti-skid apparatus in which it is not required to decrease the hydraulic pressure in the pressure chamber R to a level lower than that in the master cylinder 11.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid apparatus for an automotive vehicle for installation in a vehicle braking system between a master cylinder and a wheel brake cylinder, comprising:
a regulator valve for producing a hydraulic power pressure in accordance with a hydraulic braking pressure from said master cylinder;
a control cylinder disposed in a hydraulic circuit connecting said master cylinder to said wheel brake cylinder, said control cylinder including a cylinder body having a cylinder bore defined therein, a piston axially slidably disposed within said cylinder bore, said piston forming at one end thereof with said cylinder bore a pressure chamber communicating with said wheel brake cylinder, the volume of said pressure chamber being maximum at the initial position of said piston, and said piston being applied at the other end thereof with said hydraulic power pressure from said regulator valve, biasing means for biasing said piston toward said initial position and a normally open cutoff valve arranged to normally permit the flow of said hydraulic braking pressure from said master cylinder into said pressure chamber and to block said flow of said hydraulic braking pressure when said piston moves against said biasing means to an extent more than a predetermined distance from said initial position for decreasing the volume of said pressure chamber thereby to increase the hydraulic pressure in said pressure chamber to a level higher than the hydraulic braking pressure from said master cylinder; and
a changeover valve disposed in a hydraulic circuit connecting said regulator valve to said control cylinder and selectively placed in one of a first operating position for applying said hydraulic power pressure to said piston of said control cylinder, and a second operating position for discharging said hydraulic power pressure from said control cylinder.

2. An anti-skid apparatus for an automotive vehicle of claim 1, wherein said cylinder body of said control cylinder forms therein a stepped bore having a large-diameter bore and a small-diameter bore co-axially communicated with said large-diameter bore, and wherein said piston comprises a large-diameter piston axially slidably disposed within said large-diameter bore, said large-diameter piston being applied at one end thereof with said hydraulic power pressure, and a small-diameter piston axially slidably disposed within said small-diameter bore, said small-diameter piston forming at one end thereof said pressure chamber and contacting at the other end thereof with the other end of said large-diameter piston.

3. An anti-skid apparatus for an automotive vehicle of claim 2, wherein said biasing means is a spring for biasing said small-diameter piston toward said large-diameter piston.

4. An anti-skid apparatus for an automotive vehicle of claim 3, wherein said spring is disposed within said pressure chamber.

5. An anti-skid apparatus for an automotive vehicle of claim 2, wherein said small-diameter piston is integral with said large-diameter piston.

6. An anti-skid apparatus for an automotive vehicle of claim 3, wherein said normally open cut-off valve is disposed within said pressure chamber of said control cylinder.

7. An anti-skid apparatus for an automotive vehicle of claim 6, wherein said automotive vehicle is equipped with a power-assisted steering apparatus actuated by a hydraulic pressure produced by a fluid pump, and wherein said regulator valve comprises a valve body defining a bore therein, and a piston axially slidably disposed within said bore, said piston being applied at one end thereof with said hydraulic braking pressure from said master cylinder and applied at the other end thereof with said hydraulic pressure supplied to said power-assisted steering apparatus, and said piston being provided with means for producing said hydraulic power pressure from said hydraulic pressure supplied to said power-assisted steering apparatus in accordance with said hydraulic braking pressure from said master cylinder.

8. An anti-skid apparatus for an automotive vehicle of claim 6, wherein said cylinder body is provided with a port communicating with said master cylinder through a hydraulic circuit, said small-diameter piston is provided with a passage communicating with said port of said cylinder body and having an open end opening to said pressure chamber, and wherein said normally open cut-off valve comprises a valve member disposed within said pressure chamber and seated on said open end of said passage, a spring for biasing said valve member toward said small-diameter piston, and a holder secured to said cylinder body and arranged to hold said valve member axially movable and retain said valve member away from said small-diameter piston at a predetermined distance from the initial position thereof.

9. An anti-skid apparatus for an automotive vehicle of claim 8, further comprising an auxiliary changeover valve disposed in a hydraulic circuit between said master cylinder and said port of said cylinder body, and selectively placed in one of a first operating position for communicating said port with said master cylinder and a second operating position for communicating said port with said wheel brake cylinder.

10. An anti-skid apparatus for an automotive vehicle of claim 9, wherein said auxiliary changeover valve comprises a three ports-two positions solenoid-operated directional control valve.

11. An anti-skid apparatus for an automotive vehicle of claim 10, said changeover valve comprises a three ports-two positions solenoid-operated directional control valve.

12. An anti-skid apparatus for an automotive vehicle of claim 10, said changeover valve comprises a combination of an input control valve of two ports-two positions solenoid-operated directional control valve and an output control valve thereof.

13. An anti-skid apparatus for an automotive vehicle of claim 9, wherein said master cylinder is a tandem master cylinder having a front pressure chamber connected to a first hydraulic circuit communicating with a left-hand front wheel cylinder and a right-hand rear wheel cylinder, and a rear pressure chamber connected to a second hydraulic circuit communicating with a right-hand front wheel cylinder and a left-hand rear wheel cylinder, and wherein said control cylinder, said changeover valve and said auxiliary changeover valve are disposed in each of said first and second hydraulic circuits respectively.

* * * * *